Aug. 2, 1960 — C. P. ROHMANN — 2,947,169
FLUID FLOWMETER
Filed Dec. 5, 1957 — 4 Sheets-Sheet 1

INVENTOR.
CHARLES P. ROHMANN
BY Arthur H. Swanson
ATTORNEY.

Aug. 2, 1960     C. P. ROHMANN     2,947,169
FLUID FLOWMETER Filed Dec. 5, 1957     4 Sheets-Sheet 2

INVENTOR.
CHARLES P. ROHMANN
BY *Arthur H. Swanson*
ATTORNEY.

Aug. 2, 1960

C. P. ROHMANN 2,947,169

FLUID FLOWMETER

Filed Dec. 5, 1957

*INVENTOR.*
CHARLES P. ROHMANN

BY Arthur H. Swanson

ATTORNEY.

Aug. 2, 1960

C. P. ROHMANN 2,947,169

FLUID FLOWMETER

Filed Dec. 5, 1957

*INVENTOR.*
CHARLES P. ROHMANN

BY

ATTORNEY.

United States Patent Office 2,947,169
Patented Aug. 2, 1960

2,947,169

FLUID FLOWMETER

Charles P. Rohmann, Hatboro, Pa., assignor to Minneapolis-Honeywell Regulator Company, Minneapolis, Minn., a corporation of Delaware Filed Dec. 5, 1957, Ser. No. 700,820

18 Claims. (Cl. 73—206)

The invention relates to a continuously operated square root integrator for measuring the total flow of fluid that is passing through a flow line during any given period of time.

A more specific object of the present invention is to provide a flow integrating apparatus from which a portion of a regulated fluid supply is permitted to flow through a flow nozzle to atmosphere at a mass flow rate that is linearly proportional to the flow of the fluid being measured.

One of the chief objects of the present invention is to provide a square root integrator that is capable of producing a progressively greater number of discrete pulses per unit of time as a flow of fluid to be measured is increased and/or is capable of producing a progressively decreasing number of pulses per unit of time as this flow of fluid is decreased.

Fluid flow integrating apparatus that have been used prior to the present invention have employed various types of continuously operated counter driving mechanisms to indicate the total flow of fluid that has passed through a flow line over a given period of time. One disadvantage of this type of mechanism is that since such driving mechanisms are employed to continuously drive a counter at varying rates of speed it is difficult to obtain an accurate flow count rate as the cycle at which each count is being made varies from one count to the next. It is therefore another object of the present invention to provide a more accurate way of measuring the count rate of a flow integrating apparatus by providing it with a pulse mechanism for driving a flow totalizing counter or one in which the count on the counter will only be changed when the pulse mechanism sends a pulse to the counter.

Another object of the present invention is to provide flow integrating apparatus of the aforementioned type in which an adjustment of an air pressure regulator is the only adjustment that is required to change the total number of pulses per unit of time that its pulse mechanism is capable of delivering to the flow counter for any given rate of flow that is being measured.

A still further object of the present invention is to provide a flow integrating apparatus that contains component parts that are easily assembled and which can be economically calibrated.

A better understanding of the present invention may be had from the following detailed description when read in connection with the accompanying drawings in which.

Figure 1:
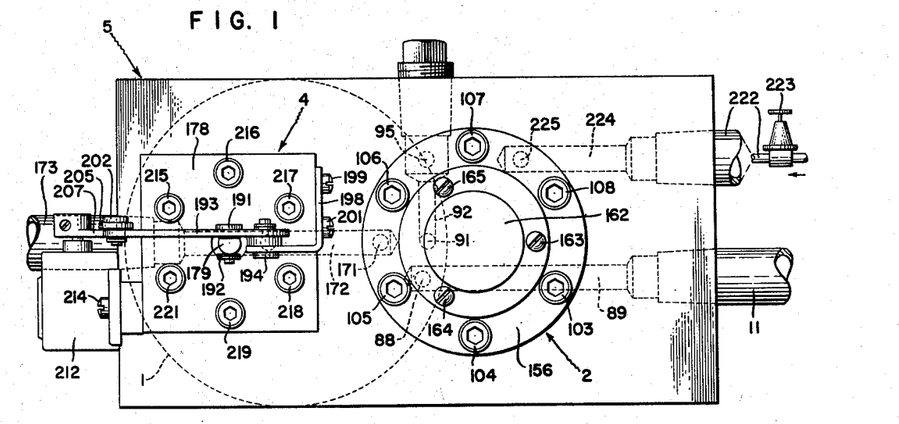
Fig. 1 shows a plan view of a tripping and switching relay unit, a regulator unit, a counter unit and manifold which comprise the aforementioned square root integrating apparatus.
Figure 2:
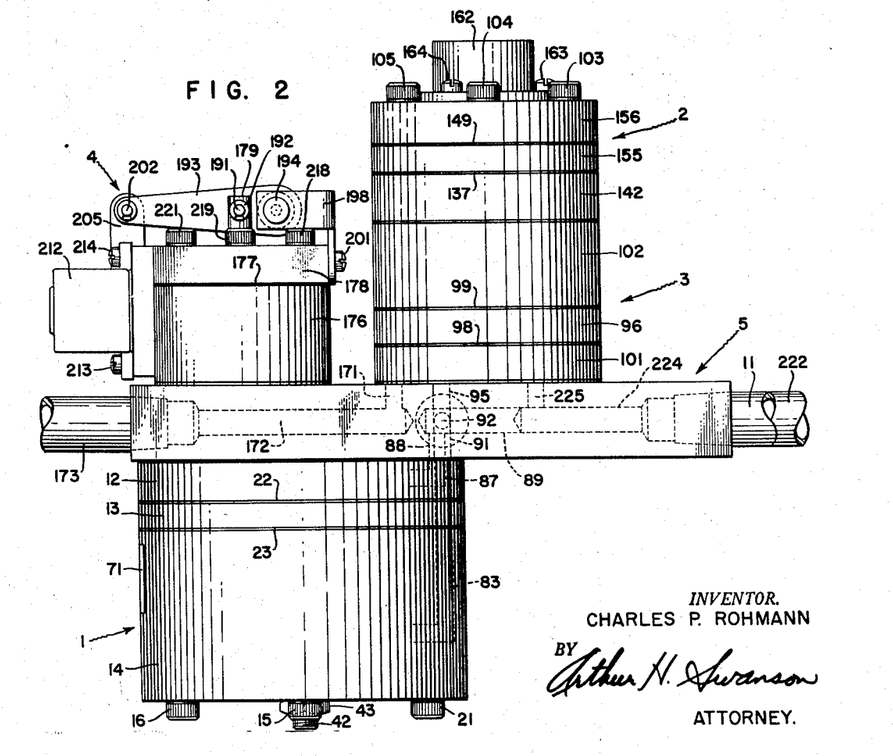
Fig. 2 shows a front elevation of the aforementioned square root integrating apparatus of Fig. 1.

The square root integrating apparatus disclosed in Figs. 1 and 2 shows a regulator unit 1, a tripping relay 2, a switching relay 3, a fluid pressure pulse actuating counter unit 4, and a manifold 5.

Figure 3:
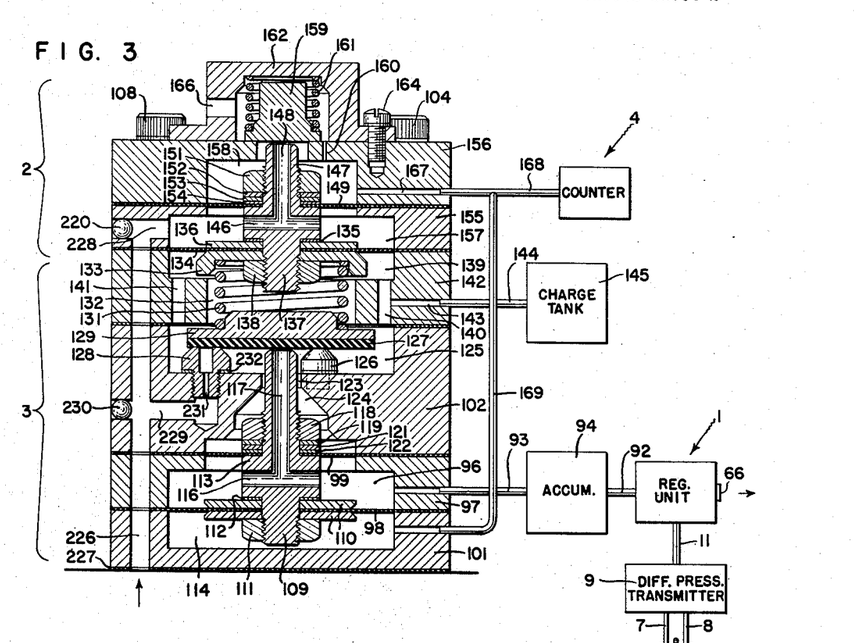
Fig. 3 shows a cross sectional view of the tripping and switching relay unit taken along the line 3—3 of Fig. 4.

Fig. 3 is shown to illustrate schematically how the square root integrating apparatus shown in Figs. 1 and 2 may be employed to measure and totalize a flow of fluid of varying magnitude that is flowing through the conduit 6, in the direction of the arrow, through an orifice. In this regard a low pressure connection 7 and a high pressure connection 8 are both shown at one of their ends opening into the interior of the conduit 6 and having their other ends connected to a differential pressure measuring apparatus 9, such as is disclosed in Konrad H. Stokes et al. patent application Serial No. 347,812, filed April 9, 1953, now U.S. Patent No. 2,823,-688. This differential pressure measuring apparatus is shown having an output pressure signal transmission conduit 11 that has its signal receiving end connected to a regulator unit 1.

Figure 5:
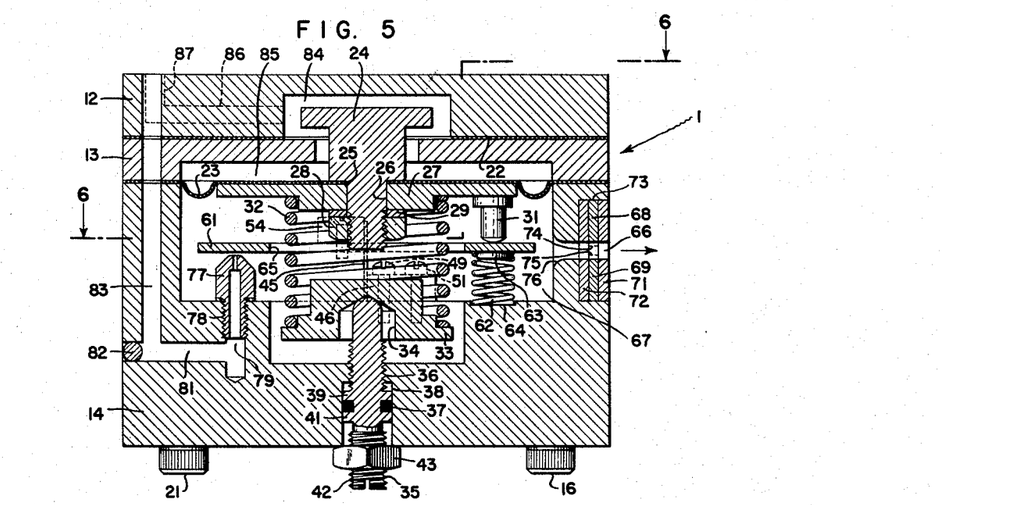
Fig. 5 is a cross sectional view of the regulator unit taken along the line 5—5 of Fig. 6.
Figure 6:
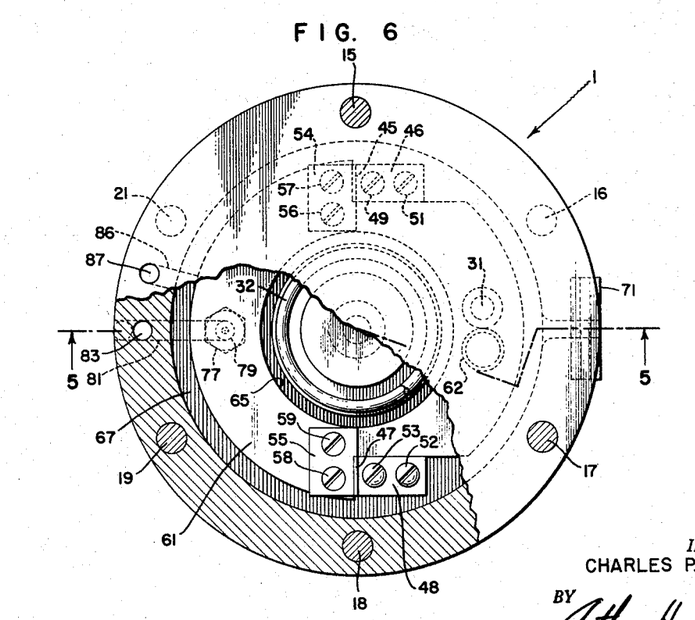
Fig. 6 is a partial cross sectional plan view of the regulator unit shown in Fig. 5.

As can best be seen in Figs. 5 and 6 the body of this regulator unit is made of three cylindrical portions 12, 13, and 14 which are integrally fixed to each other and retained in a fixed position on the manifold 5 by means of suitable threads (not shown) on the upper end of the bolts 15, 16, 17, 18, 19, and 21. Fig. 5 also shows a gasket 22 between the periphery of cylindrical portions 12 and 13 and a molded diaphragm 23 retained between the periphery of the cylindrical portions 13 and 14. This figure also shows a cylindrical plug 24 passing through a control aperture in the central portion 25 of the diaphragm 23 as well as passing through an aperture in the central portion 26 of the plate 27. A nut 28 is shown in threaded engagement with the lower portion of plug 24 and is shown tightened to such a position to retain the lock washer 29 in a compressed position against the lower surface of the plate 27. Fixedly attached to the right end of the plate 27 there is shown a stop pin 31. The lower central portion of the plate 27 is shown in contact with and being supported by coil spring 32. The lower end of this coil spring is shown in surface to surface contact with a spring support block 33. The central portion of this spring support block is shown having a wall 34 forming an aperture therein. A spring adjusting screw means 35 is shown having its upper end in engagement with the wall 34. A lower portion of the screw means 35 is shown at 36 in threaded engagement with an open threaded part in the wall portion 14. A ring shaped sealing means 37 in contact with the wall portion 38 forming an aperture in the wall 14 is shown located between two flanged portions 39, 41 of the screw means 35. The lower portion of the screw means 35 is shown threaded at 42 and having mounted thereon a nut 43 that is tightened to such a position on the screw means 35 that it bears against the wall portion 14.

Mounted on the internal portion of the wall 14 there is shown the parts 45, 46, 47, 48 of a flexible pivot. These parts are mounted on the wall 14 by means of the screws 49, 51, 52, 53. Other portions 54, 55 of this flexible pivot are shown fixedly attached by means of the screws 56, 57, 58, 59 to a flapper plate 61. This flapper plate 61 is shown not only supported in a see-saw fashion upon the aforementioned pivots but also is shown in Fig.

5 as having a coil spring 62 that applies a spring force in an upward direction to the underside of the right end of the flapper plate 61. This upper end of the spring 62 is shown surrounding a boss portion 63 that is integral with the flapper plate 61 and its lower end is shown in contact with the surface 64 of the cylindrical portion 14. The inner wall portion 65 of the flapper plate 61 forms an aperture through which the spring 32 may be readily moved in an upward or downward direction.

Adjacent the right end portion of the flapper plate 61 there is shown a temperature compensating exhaust nozzle 66 through which fluid in a chamber 67 is shown being exhausted to the atmosphere surrounding the regulator 1. The exhaust nozzle 66 is shown containing two strips of high expandable material 68, 69 that is surrounded by and sandwiched between two strips 71, 72 of low expansible material such as invar. The outer end portions of the high and low expandable strips as shown in Fig. 5 are fixedly retained in a portion 73 forming an aperture in the wall 14. Fig. 5 also shows in dotted line form at 74 and 75 the position to which the ends of the high expansion material 68, 69 will move upon an elevation in temperature surrounding this material. The inner wall portion 76 of the nozzle 66 is shown as a bell mouth configuration. Beneath the flapper plate 61, shown in Fig. 5, there is shown a nozzle 77 threadedly connected at 78 to a wall forming a passageway 79 in the body 14. The passageway 79 is in turn shown opening into another passageway 81 which is sealed from the atmospheric pressure surrounding the regulator 1 by a sealing material 82. The passageway 81 is also shown connected to a vertical passageway 83 which passes upward through body 14, 13, and 12 to the manifold 5 shown in Figs. 1 and 2 and thence to the switching relay 3.

Figs. 5 and 6 show an integral chamber 84 formed in the block 12 and a connecting chamber 85 formed in the block 13. Connected to the chamber 84 there is shown a passageway 86 that passes through the block 12 and which is connected at its outer end to a vertical passageway 87. As can best be seen in Figs. 1 and 2 of the drawings, the upper end of this passageway 87 is connected by way of the vertical passageway 88 and horizontal passageway 89 in the manifold 5 to the transmitting conduit 11 that has heretofore been mentioned as transmitting an output pressure signal from the differential pressure measuring meter 9 to the regulator unit 1.

As can best be seen in Figs. 1, 2, and 3, the passageway 83 in the regulator 1 is connected by way of the passageways 91 and 92, that is shown closed at its outer end, and passageway 93 to an accumulator 94. The sole function of this accumulator is to always maintain the pressure at this point in the system above a predetermined value. The passageway 83 in the regulator 1 is also shown connected by way of passageways 91, 92, 93, and 95 in the manifold 5 to a pressure chamber 96 that is surrounded by the cylindrical portion 97 forming a portion of the switch relay 3. A diaphragm 98 forms a lower flexible wall portion of the chamber 96 and a second diaphragm 99 forms an upper flexible wall portion of this chamber. The peripheral portion of diaphragm 98 is shown positioned between the cylindrical portion 97 and 101 and the peripheral portion of diaphragm 99 is shown positioned between the cylindrical portion 97, 102. In order to retain these diaphragms 98, 99 in the tight contact with their associated cylindrical portions there is provided at the location shown in Fig. 4 a plurality of tie bolts 103, 104, 105, 106, 107, and 108 that pass through openings in peripheral portions of these diaphragms and which have their lower end threadedly connected to the manifold 5. The lowermost diaphragm 98 is shown having a member 110 fixedly clamped to it by means of the bolt member 109 and a nut 111 threadedly mounted on the bolt member that retains a gasket 112 in a compressed condition against the head 113 of the bolt 109. This diaphragm clamping means 110 thus provides a means of sealing off chamber 96 from the lowermost chamber 114.

Integrally connected to the upper head portion 113 of the bolt member 109 there is shown a member 113 having horizontal and vertical passageways 116, 117. Surrounding the lower end of the passageway 117 there is shown threadedly mounted thereon a nut 118 whose lower portion is shown compressing two washers 119, 121 against the gasket 122 which in turn is compressed against the outer surface of the member 113.

The upper portion of the member 113 is shown passing through an opening formed by the wall part 123 of cylindrical portion 102. This wall portion 123 is shown acting as a guide for the member 113 as well as permitting a small degree of opening between the chambers 124 and 125 which are formed within the confines of the cylindrical portions 102.

The chamber 125 is shown containing a stationary stop 126 whose upper surface is in contact with the disc 127 as is also the nozzle 128. This disc 127 may be made of a synthetic rubber or equivalent material and is bonded to the lower surface of the embossed disc 129. Seated in the manner shown on the disc 129 there is a coil spring 131. This spring is shown extending in an upward direction through an aperture formed by the wall 132 of the cylindrical portion 142 and in engagement at its upper end with a cup-shaped plate 133. The upper surface of the plate 133 is shown in contact with the diaphragm 134 on which there is mounted a washer 135 and a gasket 136. To retain the cup-shaped plate 133 snugly in place against the lower surface of diaphragm 134 and the washer 135 in a compressed condition against the upper surface of this diaphragm there is shown a threaded bolt member 137, 138. The lower chamber 125 is shown connected to the chamber 139 not only by the aperture formed by the wall 132 but also by the passageways 140, 141 in member 142. Passageway 143 and conduit 144 are shown connecting passageway 141 with a pressure charge tank 145.

Integral with the head part of the bolt member 137 there is shown a partially threaded member having a horizontal passageway 146 and a vertical passageway 148. Surrounding the lower portion of the partially threaded member 147 there is shown a diaphragm 149 that is held in a compressed state by tightening the nut 151 and thus forcing the washers 152, 153 to compress the gasket 154. The outer peripheral portion of both the previously mentioned diaphragm 134 and the diaphragm 149, that is held between the cylindrical portion 155, 156, are retained in position by means of the threaded bolt 103— 106 passing therethrough as previously noted under the description of the diaphragm 98.

Figure 4:
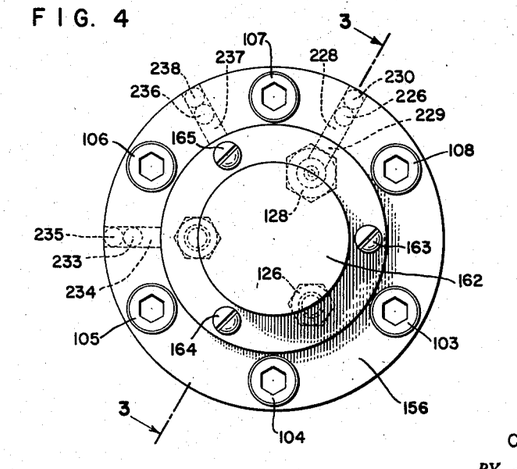
Fig. 4 shows a top plan view of the tripping and switching relay unit shown in Fig. 3.

The passageway 146 in the member 147 is shown opening at its ends into the chamber 157 formed partially by the cylindrical portion 155 and the passageway 148 is shown opening into the top portion of the chamber 158 formed partially by the cylindrical portion 156. Spaced from the upper edge of the member 147 there is shown a valve member 159 that is seated on the upper surface of the cylindrical member 156. Also shown cut into the member 156 is a restricted passage 160. Applying a downward spring force against the upper surface of this valve member there is shown a coil spring 161 that has its upper end in contact with the cap member 162. This cap member 162 contains one bolt 164 as shown in Fig. 3 and two other similar connecting bolts 163, 165 as shown in Fig. 4 to retain it in position on the top of the cylindrical member 156. This cap member 162 also contains an exhaust port formed by its wall portion 166.

Figure 7:
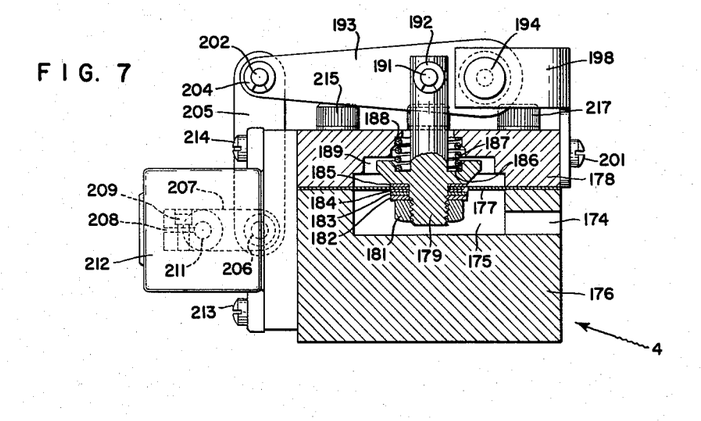
Fig. 7 is a cross-sectional view of the counter unit taken along the line 7—7 of Fig. 8.

In Fig. 3 a passageway 167 and a conduit 168 are schematically shown connecting the chamber 158 to the counter 4. The conduit 168 is in turn shown connected by way of the conduit 169 to the chamber 114. As can best be seen in Fig. 2 this chamber 114 is in turn connected through pasageways 171 and 172 in manifold 5 to a conduit 173 which in turn could either be plugged or remain open as shown so that it can be used as a transmission line to a second counting mechanism if it is so desired. The conduit 168 is fixedly connected by way of the counter passageway 174 to the chamber 175 within the lower base portion 176 of the counter drive mechanism 4 as can best be seen in Figs. 3 and 7. In Fig. 7 there is shown a diaphragm 177 separating the lower base portion 176 from an upper portion 178 and a threaded stud 179 is shown protruding through the central aperture portion of diaphragm 177. This stud 179 is shown threadedly connected by means of the nut 181, washers 182, 183, 184, gasket 185 to the diaphragm 177. The upper end of this stud contains a dished out portion 186 that retains a spring 187 therein. The upper end of the spring 187 is shown retained in a slidably compressed condition in a recess 188 formed in the upper chamber portion 189. The upper end of the stud 179 is shown connected by means of the pin 191 having a locking ring 192 to a lever arm 193. The right end of the arm 193 is connected by a pin 194 having a cylindrical boss 195 and suitable retaining washers 196, 197 thereon to a stationary L-shaped lug 198. This lug 198 in turn is fixedly attached to the upper portion 178 by means of the screws 199 and 201. The other or left end of the lever 193 is shown connected by means of a pin 202 having a retaining washer 204 thereon to a vertical link 205. The lower end of this link 205 is attached by means of a pin 206 to a horizontal lever 207. A slotted out portion 208 is shown at the left end of this lever 207. The left end of the lever is provided with a screw 209 which when tightened as shown retains this end of the lever fixedly connected to the shaft 211. The shaft 211 represents a shaft that protrudes out of a counter 212 which when rotated in a counter-clockwise direction from the position shown in Fig. 7 will cause the counter to register an additional unit count to the reading indication already on the counter. This counter mechanism may be of any readily available commercial type and is shown attached by means of two screws 213, 214 to the upper and lower parts 178, 176 of the counter drive mechanism 4 which are in turn shown joined together by means of bolts 215, 216, 217, 218, 219, and 221.

Fig. 4 shows a plan view of the tripping and switching relays 2 and 3 shown in Figs. 1, 2, and 3. The main purpose of the view shown in Fig. 4 is to show how the various chambers shown in the relays of Fig. 3 are connected to the manifold passageway shown in Figs. 1 and 2. For instance, a filtered air supply line pressure flows through the conduit 222 that has a pressure regulator 223 connected therewith to maintain a constant fluid pressure in conduit 222 as is shown in Fig. 1. Connected to this conduit there is shown a bored out passageway 224 in the manifold 5. The inner end of this passageway 224 is, as is shown in Fig. 1, connected to a vertical passageway 225 that is in alignment with the vertical passageway 226 that is shown passing through a gasket 227 and a cylindrical portion 101, 97, 102, and 155 shown in Fig. 3. The vertical passageway 226 is shown having an upper horizontal portion 228 that is sealed by a spherical sealing means 220 at its outermost end and an inner end that opens into the chamber 157. This vertical passageway 226 also has a lower horizontal portion 229 that is sealed by spherical sealing material 230 at its outermost end and connected to a restricted passageway 231 that forms a portion of a nozzle 128. This nozzle 128 is shown threadedly connected to the cylindrical portion 102 and which is retained in the compressed condition against the gasket 232.

Going in a clockwise direction from passageway 226 shown in Fig. 4 the next passageway that is shown is the passage 233. This passageway 233 which is aligned with passageway 171 in the manifold 5 and passes upward through a part of cylindrical portion 101. The passageway portion 101 is shown in Fig. 4 connected to the chamber 114 by way of the horizontal passageway 234. The outermost portion of this horizontal passageway 234 is sealed off as shown by suitable spherical sealing means 235. The final passageway shown in Fig. 4 is a vertical passageway 236. This passageway passes upward through the gasket 227, cylindrical portion 101, part way up through the cylindrical portion 97 and opens into a horizontal passageway 237 that in turn opens into the chamber 96. The other or outer end of this horizontal passageway 237 is plugged by means of a spherical seal 238. The lowermost end of the passageway 236 is connected by way of a passage 95, 92, and 91 in the manifold 5 as shown in Fig. 1 to the passageway 83 in the regulator 1 as is best shown in Figs. 2 and 5.

In Fig. 3 of the drawing there is shown a differential pressure measuring apparatus 9 that is used in conjunction with the square foot integrating apparatus 1, 2, 3, 4, 5 to measure the flow of a fluid passing through the conduit 6. This differential measuring apparatus 9, in turn, is used to transmit a fluid pressure signal through the conduit 11 that is at a pressure level equal to 3 plus a constant times the square root of the flow that is taking place in the conduit 6. This pressure signal is applied to the chamber 84 of the regulator unit 1, shown in Figs. 1, 2, 5, and 6 of the drawing, by way of the conduit 11 and passageways 89, 88, 87, and 86. Depending on the magnitude of the flow of fluid passing through the flow line 6 the level of the pressure being applied to this chamber 84 is such that it will vary anywhere between 3 and 15 pounds per square inch. If the flow of the fluid being measured by the differential pressure measuring apparatus 9 is increased the pressure level of the fluid being applied to the chamber 84 will also be increased. As the level of the pressure in the chamber is increased, the diaphragm 23 will be moved in a downward direction from the position shown in Fig. 5 of the drawing, causing the stop pin 31 attached to the plate 27 to also move in a downward direction against flapper plate 61. As this downward motion of pin 31 is transmitted to plate 61 in this manner, the plate 61 will be caused to rotate in a clockwise direction about its flexible pivots 45—48 an amount that will be directly proportional to the level of pressure being applied to the top of the diaphragm 23. It should be noted that the screw means 35 may be adjusted so that the pressure in the chamber 67 is retained at a level that is always 3 pounds less than the pressure in the chamber 84.

As the flapper plate 61 is rotated in the aforementioned manner, it will move away from the face of the nozzle 77 and permit a portion of the regulated air supply to be applied to the chamber 67. The portion of this air that is applied to the chamber 67 is made available by means of the passageways 117, 116, chamber 96, horizontal passageways 237 cut in the cylindrical portion 97, vertical passageways 236 cut in the cylindrical portion 97, 101, and gasket 227, passageways 95, 92, 91 in manifold 5 and the passageways 83, 81, and 79. The fluid in chambers 67 is bled through the temperature compensating exhaust nozzle 66 to the atmosphere that surrounds the regulator 1.

The arrangement of the regulator unit 1 shown in Figs. 5 and 6 of the drawing is such that as the flow through the flow line 6 is further increased the level of the pressure signal that the differential pressure measuring apparatus 9 is then applying to the chamber 84, 85 of the unit 1 is also increased. This latter mentioned increase in pressure level will cause the diaphragm 23, disc 27, pin 31 to rotate the flapper plate 61 still further in a clockwise direction about its pivot 45—48 and to place it in a position that is still further away from the nozzle 77. This action will permit a still greater portion of the previously mentioned regulated flow of air to pass from the chamber 67 through the temperature compensating exhaust nozzle 66 to atmosphere which mass flow will be directly proportional to the increase in mass flow that is taking place in the conduit 6.

In a similar but opposite manner to that just described it can be seen that when the flow through the conduit 6 decreases the flapper plate 61 will be moved toward the nozzle 77 and this will result in a reduction of the amount of the previously mentioned regulated pressure in chamber 96 that will be permitted to be applied to chamber 67 and exhausted at a reduced mass flow rate from the exhaust nozzle 66 of unit 1 to the atmosphere surrounding this unit.

The function of the regulator unit 1 just described is thus similar to that of a one-to-one relay in that it is arranged to adjust the fluid pressure signal in chamber 67, that is flowing through the exhaust nozzle 66, to a level that is always 3 pounds less than the level of the output pressure signal of the differential pressure measuring apparatus 9 that is transmitted through conduit 11. With such an arrangement the mass flow of the regulated supply of air that will thus be permitted to flow through the exhaust nozzle 66 will always be made directly proportional to the flow of fluid passing through the conduit 6.

As can best be seen in Fig. 1, a filtered air supply flows from a suitable air pressure supply source in the direction of the arrow shown in the upper right hand corner of Fig. 1 through the conduit 222. A precision pressure regulator 223 located in this filtered air supply line 222 is adjusted to a position in which a selected constant supply of air at some preselected pressure level will be continuously delivered to the left end of the fluid delivery conduit 222. The adjustment of this regulator, in turn, will permit variation in the total number of pulses per unit of time that the pulse creating tripping and switching relay mechanisms 2, 3, to be hereinafter described, will be able to deliver to the pulse counter 4 for any given rate of flow of fluid in conduit 6 that is being measured by the differential pressure measuring apparatus 9. This regulated fluid pressure is made available to the nozzle 128, shown in Fig. 3, by way of the passageways 222, 224, 225, 226, 229, and the restricted passageway 231. When the disc 127, shown in Fig. 3, is in contact with the upper surface of the nozzle 128, as shown, the aforementioned regulated supply pressure will be retained within the nozzle. However, when the disc 127 is moved in an upward direction away from the nozzle, as will be hereinafter described, the aforementioned regulated supply pressure will then be bled into the chamber 125.

Figure 8:
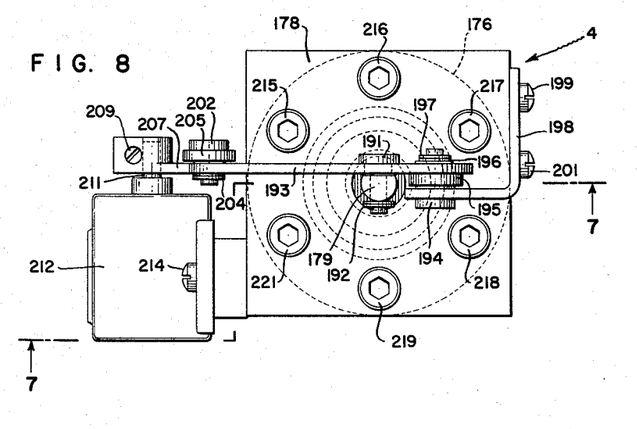
Fig. 8 shows a plan view of the counter unit.

This regulated supply pressure is also made available to the pulse counting mechanism 4 by way of the passageways 222, 224, 225, 226, and 228, chamber 157 passageways 146, 148, chamber 158, passageways 167 and 168. The regulated fluid supply flowing through the conduit 168 is also made available to the chamber 114 by means of the passageway 169. The regulated fluid supply pressure in chamber 114 may also be made available to a remotely located counter mechanism, not shown, by way of the passageways 234, 233 of relay 3, passageways 171, 172 in manifold 5 and the conduit 173. This last mentioned counting mechanism, not shown in the drawing, may be remotely located at the end of conduit 173 that is at a distance from the manifold 5 and be made identical to the counter 4 that is shown in detail in Figs. 7 and 8 of the drawing.

For purpose of illustrating how the aforementioned integrating apparatus functions it may be assumed that the pressure in chamber 158 and 114 and counter 4 are at initially a lower level than the level of the regulated fluid pressure that the regulator 223 is able to make available to these chambers and counter. As the regulated fluid pressure is then applied to these chambers 114 and 158 and counter 4, the level of the pressure in these chambers and counter will be built up to the level of the pressure being applied by the pressure regulator 223. When this regulated air pressure level has been reached in either of the aforementioned counting mechanisms, for example, counting mechanism 4, the diaphragm 177 and stud 179 of this counting mechanism will be caused to move in an upward direction, and the lever 193 to be moved in a clockwise direction about the pin 194 shown in Figs. 7 and 8.

While the aforementioned counter moving action is taking place and the level of the pressure in chamber 114 is built up to the level of the aforementioned regulated supply pressure the diaphragm 98 that forms an upper flexible wall of this chamber will have then moved in an upward direction from the position shown in Fig. 3. As the aforementioned movement of the diaphragm 98 takes place the member 113 which is connected by bolt 109 to this diaphragm will likewise be moved in an upward direction. As the upper end of the member 113 is moved in this manner the uppermost end of the portion 117 will be brought into contact with the disc 127 to move it in an upward direction away from the uppermost surface of the nozzle 128.

The aforementioned action will thus permit the regulated fluid supply pressure to bleed from nozzle 128 into the chamber 125 through passageways 140, 141 to chamber 139 and through passageways 143, 144 to charge the charge tank 145 so that the pressure in this tank may be raised to a predetermined upper level that is less than the output pressure level of the air being produced by the precision regulator 223.

The rate at which the portion of the regulated air supply pressure in chamber 96 flows to the atmospheric exhaust chamber 67 will depend upon the magnitude of the pressure signal from the differential pressure measuring means 9 that has been applied to chamber 85, at any instant of time to force the diaphragm 23 in a downward direction. If this pressure signal increases in chamber 85, the pressure in the chamber 96 will be caused to drop and the rate of mass flow of fluid being applied through nozzle 77 to chamber 67 will be increased and vice versa. The speed at which the pressure in chamber 96 is caused to drop will therefore be determined by the amount of fluid that is permitted to pass through the nozzle 77 and the exhaust nozzle 66 which, as previously mentioned, is adjusted by the pressure signal from the differential pressure measuring apparatus 9 that is applied to the top of the diaphragm 23.

If the magnitude of the pressure being applied to the top of the diaphragm 23 increases the speed at which the pressure in chamber 96 will decrease will likewise go up and/or vice versa.

The speed at which the aforementioned level of the air pressure in the chamber 96 is lowered will be the governing factor that determines the interval of time that will be necessary to discharge the charge tank 145 to a predetermined lower limit. At this time the tripping and switching relays then charge the charge tank 145 to a predetermined upper pressure limit that is less than that produced by the precision regulator 223. As will be hereinafter described, the time it takes to go through a charge and a discharge cycle of the tank 145 will in turn govern the frequency at which the counts will be registered on the counter 4.

As the pressure in the chamber 114 is built up to the level of the regulated fluid pressure being controlled by the precision pressure regulator 223 it will go from a zero pressure level up to a level that is equal to the air being produced by the regulator 223. The diaphragm 98 will then be moved in an upward direction against the pressure in the chamber 96, 117, 125 and against the bias of spring 131. When this regulator pressure level is reached the upper end of passageway 117 of member 113 will be forced in an upward direction against the disc 127. When this same regulator pressure level in chambers 157 and 158 is reached it will cause the diaphragms 149, 134, and the bolt 137 attached therewith to give a positive feedback force action or an action in which the cup-shaped plate 133 is forceably snapped against the upper surface of wall 132. The aforementioned increase in pressure in chamber 114 will cause passageways 117 and chamber 96 to be sealed off from chamber 125 and the regulated supply pressure from regulator 223 to be bled by way of the nozzle 128 to the chamber 125, by way of passageways 140, 141 to chamber 139 and by way of passageways 140, 143, 144 to charge tank 145.

As this action occurs the increase of the level of the pressure in chamber 139 builds up until it is large enough to cause the diaphragms 149, 134, the bolt 137 and upper end of 147 attached thereto to be moved in an upward direction into contact with the underside of valve member 159. When this occurs, the regulated pressure flowing into chamber 158 will be cut off and the pressure in this chamber will start to fall due to it being bled to atmosphere through the restricted passage 160. As soon as the pressure level of the fluid in chamber 158 starts to be reduced in this manner the downward feedback force action in diaphragm 149 is reduced causing the upper end of 147 to lift the valve member 159 from its seat allowing the pressure in chamber 158 to drop to atmospheric pressure. This action will thus cause the regulated air supply pressure in chamber 158, the counter 4, and the chamber 114 to be exhausted to atmosphere and to be thus rapidly dropped to a zero gage pressure. This action will permit the counter spring 187 shown in Fig. 7 to expand in a downward direction and thus permit the lever 193 to be moved in a counterclockwise direction about the pin 184 to its original position and thus effect a count on the counter 4. The resulting pressure drop to zero gage in chamber 114 will cause the parts 109 and 117 to again drop back to a position in which part 109 contacts the upper surface of 101 since the pressure then in chamber 96 that is applied by the differential pressure measuring apparatus 9 is now much greater than the pressure in chamber 114. When the integrator is in this latter mentioned position the pressure in chamber 139, 125 and 124 can again be applied through passageways 117, 116, to chamber 96 and through passageways 95, 92, 91, 83, 81, 79, and bled through a nozzle 77 to chamber 67 which in turn is bled to the atmosphere through the nozzle 66. It can readily be seen by observing Fig. 3 of the drawing that the upper end of the member 113 forming the passageway 117 is clear of the disc 127 and the tanks 145, 94 at this time are connected to one another in such a manner that the pressure in these tanks will be equal and at a higher level of pressure than when this charging was started. This will cause the two tanks' pressures to drop in unison to a lower level.

As the level of the pressure in chambers 124, 125, 139 and tank 145 continue to drop due to the bleed of this fluid through exhaust nozzle 66 of regulator unit 1 it will reach a preselected lower pressure limit. When this lower pressure limit is reached, the tripping relay 2 will have been dropped down to the position shown in Fig. 3 in which the pressure of the fluid in the chamber 114 can at this point again be built up to the level of the regulated supply pressure of regulator 223 that is flowing through the passageways, for example, 226 and 228.

From the above description of the square root integrating apparatus set forth in this application it can be seen that a regulator unit 1 including a diaphragm operated bleed valve means 61, 77 is positioned in relation to the magnitude of the output pressure from a differential pressure measuring apparatus 9. It also can be seen that this regulator unit 1 permits a portion of the regulated air supply flowing through the precision regulator 223 to be exhausted to atmosphere through a temperature compensated flow nozzle 66 at a mass flow rate that is linearly proportional to the flow that is being measured by the differential pressure measuring apparatus 9. This application also discloses that this mass flow is the square root function of the pressure signal being transmitted by the differential pressure measuring apparatus 9 to the diaphragm operated bleed valve 61, 77. This application further has pointed out that by permitting a selected constant supply of air at some preselected level to be delivered from the precision regulator 223 through the relay units 2, 3, regulator unit 1 and the exhaust orifice 66 that the relay units 2, 3 may be made to dump and charge the chambers 157 and 114 of units 2 and 3 at a rate per unit of time or frequency that is dependent and proportional to the mass flow of fluid passing through the exhaust nozzle in the unit 1. This application also points out that the construction of the relay units 2 and 3 are such that the chamber 158 formed by the diaphragm 149 and the valve member 159 acts as a regenerative or snap back diaphragm chamber that will be connected to a counter drive 4 which will directly record the mass flow of air being permitted to exhaust through the exhaust nozzle 66 of unit 1 in a digital manner.

The present application thus discloses a square root extracting integrator that develops a mass flow of fluid through a bleed nozzle 66 of a 1:1 regulator 1 that is proportional to a flow to be integrated and a means for measuring the former mentioned flow that consists of a flow of air passing to the regulator from a charge tank that receives a constant mass of air each cycle and a means of totalizing the number of cycles.

I claim:

1. A flow integrating apparatus comprising a counter, a pressure regulator operably connected to supply a regulated fluid pressure, a tripping relay, passageways operably connected to transmit said supply fluid by way of said tripping relay to said counter, a switching relay, a charge tank, other passageways operably connected to transmit said supply fluid by way of said switching relay to said charge tank to thereby provide a way of charging said tank to a fixed pressure level during a predetermined period of time, a one-to-one pressure regulator unit, a pressure actuated valve means in said switching relay operably connected to cut off said supply fluid from being transmitted by way of said second mentioned passageways to said charge tank when said fixed pressure level of said fluid has been reached, an additional passageway operably connected at one end to said fluid pressure that is being applied to said charge tank by way of said switching relay and connected at its other end to a bleed valve opening into a flexible atmospheric exhaust chamber of said one-to-one pressure regulator unit, a pressure actuated means operably connected to partially seal off said one end of said additional passageway when said pressure of said fluid in said tank is below said fixed pressure limit and to open said last mentioned end of said passageway when said fixed pressure level of said fluid has been reached, a differential pressure transmitter operably connected at its input end to the fluid pressure on either side of an orifice in a flow line containing a flow of fluid to be integrated, said transmitter being operably connected to apply an output pressure signal at its output end to said bleed valve in said one-to-one pressure regulator unit to increase or decrease the opening of said last mentioned bleed valve and to thereby simultaneously decrease or increase the time required to reduce the pressure in said charge tank to a predetermined lower fluid pressure level in accordance with increases or decreases occurring in the differential pressure on opposite sides of said orifice and valve means operably connected to said tripping relay to effect an immediate lowering of said fluid pressure in said counter to zero when said lower fluid pressure level is reached.

2. The apparatus as specified in claim 1 wherein said supply pressure regulator is comprised of a mechanically operated means to increase or decrease the pressure range between said upper and lower fluid pressure levels in said charge tank to effect a more rapid or less rapid count on said counter.

3. The apparatus as specified in claim 1 wherein said flexible exhaust chamber includes an atmospheric flow nozzle for continuously exhausting the fluid in the exhaust chamber to atmospheric pressure and wherein the mass flow of said fluid from said charge tank through said flow nozzle is proportional to the said mass flow of fluid to be integrated.

4. The apparatus as specified in claim 1 wherein said exhaust chamber includes an atmospheric flow nozzle for continuously exhausting the fluid in the exhaust chamber to atmospheric pressure, said mass flow of said fluid from said charge tank passing through said flow nozzle being proportional to said mass flow of fluid to be integrated, and wherein said supply pressure regulator includes a mechanically operated means to increase or decrease the pressure range between said upper and lower fluid pressure levels of said charge tank and to thus effect a more rapid or less rapid count on said counter.

5. The apparatus as specified in claim 1 wherein said exhaust chamber includes an atmospheric flow nozzle to continuously exhaust the fluid in the exhaust chamber to atmospheric pressure, said mass flow of fluid from said charge tank through said flow nozzle being proportional to said mass flow of fluid to be integrated, said integrating apparatus being operably connected to continuously repeat both said charging of said charge tank over a fixed period of time to a fixed pressure level and the discharging of said tank through said atmospheric flow nozzle over a varying period of time which is dependent on the mass rate of flow of said fluid that is to be integrated.

6. The apparatus as specified in claim 1 wherein said exhaust chamber includes an atmospheric flow nozzle to continuously exhaust the fluid in the exhaust chamber to atmospheric pressure, means to retain said mass flow of fluid from said charge tank through said flow nozzle proportional to said mass flow of fluid to be integrated, said integrating apparatus being operably connected to continuously repeat both said charging of said charge tank over a fixed period of time to a fixed pressure level and the discharging of said tank through said atmospheric flow nozzle over a varying period of time the latter time period being dependent on the mass rate of flow of said fluid that is to be integrated, said one-to-one pressure regulator unit including a mechanically adjusted spring biasing means to change the effect of said pressure being applied by said transmitter to said bleed valve in said unit and said supply pressure regulator including a mechanically operated means to increase or decrease the pressure range between said upper and lower fluid pressure levels of said charge tank to effect a more rapid or less rapid count on said counter.

7. The apparatus as specified in claim 1 wherein said exhaust chamber includes an atmospheric flow nozzle for continuously exhausting the fluid in the exhaust chamber to atmospheric pressure said mass flow of said fluid from said charge tank being proportional to said flow of fluid to be integrated, said flow nozzle being formed by an aperture formed in a first strip of high expansible material and in a strip of low expansible material contacting a front and rear surface of said first strip and said first strip being operably connected to said low expansible strips to enlarge the cross sectional area of said nozzle formed by said first strip upon a decrease in ambient temperature and to reduce said cross sectional area of said nozzle formed by said first strip upon increase in said ambient temperature.

8. A flow integrating apparatus, comprising a counter, a pressure regulator operably connected to supply a regulated pressure fluid, a first relay, passageways operably connected to transmit said supply fluid by way of said first relay to said counter, a second relay, a charge tank, other passageways operably connected to transmit said supply fluid by way of said second relay to said charge tank to thereby provide a way of charging said tank to a fixed pressure level during a predetermined period of time, a one-to-one pressure regulator unit, a pressure actuated valve means in said second relay operably connected to cut off said supply fluid from being transmitted by way of said second mentioned passageways to said charge tank when said fixed pressure level of said fluid has been reached, an additional passageway operably connected at one end to said fluid pressure that is being applied to said charge tank by way of said second relay and connected at its other end to a bleed nozzle that opens into a flexible atmospheric exhaust chamber of said one-to-one pressure regulator unit, a pressure actuated means operably connected to partially seal off said one end of said additional passageway when said pressure of said fluid in said tank is below said fixed pressure limit and to open said last mentioned end of said passageway when said fixed pressure level of said fluid has been reached, a differential pressure transmitter operably connected at its input end to the fluid pressure on either side of an orifice in a flow line containing a flow of fluid to be integrated, said transmitter being operably connected to apply an output pressure signal at its output end to said nozzle in said one-to-one pressure regulator unit to increase or decrease the opening of said last mentioned nozzle and to thereby simultaneously decrease or increase the time required to reduce the pressure in said charge tank to a predetermined lower fluid pressure level in accordance with increases or decreases occurring in the differential pressure on the opposite sides of said orifice and valve means operably connected to said first relay to effect an immediate lowering of said fluid pressure in said counter to zero when said lower fluid pressure level is reached.

9. The apparatus as specified in claim 8 wherein said supply pressure regulator is comprised of a mechanically operated means to increase or decrease the pressure range between said upper and lower fluid pressure levels in said charge tank to effect a more rapid or less rapid count on said counter.

10. The apparatus as specified in claim 8 wherein said flexible exhaust chamber includes at atmospheric flow nozzle for continuously exhausting the fluid in the exhaust chamber to atmospheric pressure and wherein the mass flow of said fluid from said charge tank through said flow nozzle is proportional to the said mass flow of fluid to be integrated.

11. The apparatus as specified in claim 8 wherein said exhaust chamber includes an atmospheric flow nozzle for continuously exhausting the fluid in the exhaust chamber to atmospheric pressure, said mass flow of said fluid from said charge tank passing through said flow nozzle being proportional to said mass flow of fluid to be integrated, and wherein said supply pressure regulator includes a mechanically operated means to increase or decrease the pressure range between said upper and lower fluid pressure levels of said charge tank and to thus effect a more rapid or less rapid count on said counter.

12. The apparatus as specified in claim 8 wherein said exhaust chamber includes an atmospheric flow nozzle to continuously exhaust the fluid in the exhaust chamber to atmospheric pressure, said mass flow of fluid from said charge tank through said flow nozzle being proportional to said mass flow of fluid to be integrated, said integrating apparatus being operably connected to continuously repeat both said charging of said charge tank over a fixed period of time to a fixed pressure level and the discharging of said tank through said atmospheric flow nozzle over a varying period of time which is dependent on the mass rate of flow of said fluid that is to be integrated.

13. The apparatus as specified in claim 8 wherein said exhaust chamber includes an atmospheric flow nozzle to continuously exhaust the fluid in the exhaust chamber to atmospheric pressure, means to retain said mass flow of fluid from said charge tank through said flow nozzle proportional to said mass flow of fluid to be integrated, said integrating apparatus being operably connected to continuously repeat both said charging of said charge tank over a fixed period of time to a fixed pressure level and the discharging of said tank through said atmospheric flow nozzle over a varying period of time the latter time period being dependent on the mass rate of flow of said fluid that is to be integrated, said one-to-one pressure regulator unit including a mechanically adjusted spring biasing means to change the effect of said pressure being applied by said transmitter to said bleed valve in said unit and said supply pressure regulator including a mechanically operated means to increase or decrease the pressure range between said upper and lower fluid pressure levels of said charge tank to effect a more rapid or less rapid count on said counter.

14. The apparatus as specified in claim 8 wherein said exhaust chamber includes an atmospheric flow nozzle for continuously exhausting the fluid in the exhaust chamber to atmospheric pressure said mass flow of said fluid from said charge tank being proportional to said flow of fluid to be integrated, said flow nozzle being formed by an aperture formed in a first strip of high expansible material and in a strip of low expansible material contacting a front and rear surface of said first strip and said first strip being operably connected to said low expansible strips to enlarge the cross sectional area of said nozzle formed by said first strip upon a decrease in ambient temperature and to reduce said cross sectional area of said nozzle formed by said first strip upon increase in said ambient temperature.

15. A pressure regulator, operably connected by passageways to transmit a fluid supply at a predetermined regulated pressure to an expansible first pressure chamber in a tripping relay and thence to a second expansible chamber of counting mechanism operably connected thereto, said regulator being further operably connected by passageways to simultaneously transmit said regulated pressure through a spring biasing valve into a third expansible chamber in a switching relay and thence by way of additional passageways to the interior of a charge tank of a predetermined fixed volume, a conduit connecting said regulated fluid being transmitted to said counting mechanism with a fourth expansible chamber in said switching relay, a pressure actuated hollow bolt operably connected to said spring biased bleed valve and to a flexible wall portion of said fourth chamber and to a flexible wall portion of said third chamber to close off said fluid pressure supply being supplied by said regulator through said bleed valve to said third chamber when said pressure of fluid in said third chamber and said charge tank has reached a predetermined upper pressure level, said hollow bolt being operable to discharge said fluid in said charge tank and said third chamber by way of a passageway and a bleed valve into a fifth expansible chamber of a one-to-one fluid pressure regulator when said upper pressure level in said third chamber has been reached, a transmitting means operably connected at its input end to the fluid pressure on either side of an orifice in a flow line containing a flow of fluid to be integrated, said transmitter being operably connected to generate, transmit and apply an output fluid pressure signal that is proportional to the differential pressure across said orifice to a sixth expansible chamber located within said one-to-one fluid pressure regulator, a flexible member forming a common wall between said fifth and sixth chambers against which said last mentioned signal is applied, a flapper in said fifth chamber operably connected for either movement with said flexible member towards said last mentioned bleed nozzle as the magnitude of said fluid pressure signal is decreased or for movement away from said nozzle as said pressure signal is increased, a flow nozzle for continuously exhausting the fluid in said fifth chamber to atmospheric pressure, a valve means in said tripping relay operably connected to immediately lower the pressure in said second expansible chamber to said counting mechanism to zero pressure when the pressure of said fluid in said third chamber and said charge tank has been lowered to a predetermined level by said fluid that is exhausted through said hollow bolt, said last mentioned bleed nozzle and said flow nozzle and a mechanical means operably connected to said counting mechanism to effect a digital unit flow count thereon when said fluid pressure therein is immediately lowered to said zero pressure.

16. A flow integrating apparatus comprising, a one-to-one fluid pressure regulator unit, a conduit containing a fluid passing therethrough whose flow is to be integrated, a transmitter operably connected at its input end to said conduit to measure the fluid pressure drop occurring across an orifice located in said flow of fluid passing through said conduit and being operably connected at its output end to transmit a fluid pressure signal proportional to said pressure drop to an upper pressure chamber of said fluid pressure regulating unit, said upper chamber having a flexible wall portion, a passageway having an open end portion connected to a bleed nozzle located in a lower chamber portion of said one-to-one fluid pressure regulator and having another opposite open end portion connected to an accumulator, an atmospheric exhaust nozzle in a wall portion of said lower chamber, a flapper actuating means operably connected to move with said flexible wall portion either away from said nozzle as the magnitude of said pressure signal being transmitted to said upper chamber is increased or towards said nozzle as said magnitude of said pressure signal is decreased, a pressure switching relay including a charge tank, an open passageway between a first chamber in said switching relay and said charge tank, a second bleed nozzle in said first chamber of said relay, a pressure regulator operably connected to transmit a regulated fluid pressure into and out of said second bleed nozzle in said first relay chamber to thereby increase the pressure level of said fluid in said charge tank connected thereto during one fixed time portion of a cycle, said pressure switching relay being further comprised of a second pressure chamber having a common deflectible wall portion which separates said first relay chamber from said second relay chamber, an open passageway between said accumulator and said second relay chamber, a hollow bolt member operably connected for movement with said deflectible wall portion, a passageway operably connected to said pressure regulator to transmit a regulated fluid pressure to a third pressure chamber of said relay, a spring biased flapper immediately in front of said second bleed nozzle, said third relay pressure chamber being operably connected to apply the fluid pressure being transmitted thereto against said last mentioned deflectible wall portion to move an open end of said bolt against said spring biased flapper to move said last mentioned flapper away from the face of said second bleed nozzle until the pressure of said fluid in said charge tank has reached a predetermined upper pressure level, a tripping relay, an expansible chamber of a counting mechanism operably connected by way of a passageway to said tripping relay, said tripping relay and said counting mechanism being operably connected to said regulated fluid being transmitted to said third pressure chamber by way of a second hollow passageway in a bolt member as said pressure of said fluid being transmitted is raised to said predetermined upper pressure level, a flexible diaphragm forming a wall portion of said switching relay, said flexible diaphragm being connected to move in unison with said second bolt member, said diaphragm and said second bolt member attached thereto being operably connected to be moved when said first mentioned bolt has moved said spring bias flapper away from its associated nozzle, and said pressure of said regulated fluid is thus transmitted from said charge tank by way of said first mentioned hollow bolt member to said accumulator and said fluid pressure unit and to an upper end of said second bolt to engage and thereby open a spring biased atmospheric bleed valve located in said tripping relay and to thus immediately lower the pressure level of said fluid in said last mentioned relay and said counting mechanism to zero and a mechanical link means operably connected to said counting mechanism to effect an integrated flow count on said mechanism when said drop in pressure of said fluid of said counter mechanism takes place.

17. A flow integrator, comprising a fluid pressure source, a pressure regulator operably connected to regulate the level of the pressure that said source can apply to the interior of a first fluid pressure transmitting conduit, a switching relay, a first expansible chamber in said relay, a first bleed valve positioned within said relay and operably connected by way of said first conduit to said fluid pressure source, a charge tank, a second fluid pressure transmitting conduit between said first expansible chamber and said tank, a tripping relay, a second expansible chamber in said tripping relay, a fluid pressure transmitting conduit extending between said second chamber and said first fluid pressure transmitting conduit, said second expansible chamber comprising an expansible member forming a first flexible wall portion of said first expansible chamber, a third chamber in said tripping relay comprising an expandable member forming a second wall portion of said second expansible chamber, a restricted atmospheric exhaust passageway in a non-flexible wall portion of said third chamber, a first hollow bolt member connected for movement with said first flexible wall portion and forming a passageway between said second expansible chamber and said third chamber, a third fluid pressure transmitting conduit operably connecting said third chamber to a counting mechanism, a fourth expansible chamber in said switching relay, a fourth fluid pressure transmitting conduit operably connecting said third chamber to said fourth chamber, said fourth chamber including an expansible member forming a flexible wall portion of a fifth expansible chamber, a second hollow bolt member being operably connected for movement with said last mentioned flexible wall portion and forming an open passageway between said first expansible chamber and said fifth chamber when said fluid pressure level in said fourth chamber is less than said level of said regulated fluid pressure from said fluid pressure source, said second bolt member being operably movable against a portion of said first bleed valve to close said passageway between said first and fifth chambers and open said first bleed valve to charge said tank to a predetermined upper pressure limit when said fluid pressure level of said regulated fluid pressure in said fourth chamber is made equal to the level of said regulated fluid pressure source, said first bolt member being operably engaged with a spring biased exhaust valve forming a portion of said nonflexible wall portion of said third chamber to close said passageway between said second and third chambers when said regulated fluid pressure being bled into said charge tank and said first chamber reaches said predetermined upper pressure limit and to cause said regulated fluid pressure in said third chamber, said counter mechanism and said fourth chamber to be simultaneously exhausted to atmosphere through said exhaust valve, a one-to-one fluid pressure regulator unit, a fifth fluid pressure transmitting conduit connecting said fluid pressure in said fifth chamber by way of a second bleed valve with a first chamber forming a portion of said regulator unit, a flow line, a differential pressure measuring apparatus to produce a fluid pressure signal that is proportional in a non-linear manner to the mass rate of a flow of fluid in said flow line, a sixth fluid pressure transmitting conduit to transmit said fluid pressure signal to a second chamber in said regulator unit, a mechanical means operably connected to a flexible wall forming a portion of said first regulator unit chamber and to a portion of said second bleed valve to increase or decrease the mass flow of fluid that is bled through an exhaust nozzle in said first chamber of said regulator to an amount that is linearly proportional to the mass rate of fluid in said flow line and said mass rate of flow of fluid being bleed from said fifth chamber through said exhaust nozzle in said regulator unit being operably arranged to regulate the time it will take before the said movement of said second bolt member will cause said first mentioned bleed valve to open to charge the said charge tank with said regulated fluid pressure.

18. The apparatus as specified in claim 1 wherein said exhaust chamber includes an atmospheric flow nozzle for continuously exhausting the fluid in said exhaust chamber to atmospheric pressure, said increase or decrease in said opening of said bleed valve being operable to maintain said mass flow of said fluid from said charge tank that is passing through said flow nozzle proportional to said mass flow of fluid to be integrated, a mechanically operated means connected to said supply pressure regulator and said mechanically operated means being adjustable to increase or decrease the pressure range between said upper and lower fluid pressure levels of said charge tank to thereby effect a more rapid or less rapid count on said counter.

References Cited in the file of this patent

UNITED STATES PATENTS

| | | |
|---|---|---|
| 2,090,069 | Richardson | Aug. 17, 1937 |
| 2,736,199 | Ibbott | Feb. 28, 1956 |
| 2,760,511 | Greeff | Aug. 28, 1956 |